Patented July 13, 1948

2,444,939

UNITED STATES PATENT OFFICE 2,444,939

PRODUCTION OF TITANIUM DIOXIDE PIGMENTS

Max J. Mayer, Scarsdale, N. Y.

No Drawing. Application January 15, 1948,
Serial No. 2,560

8 Claims. (Cl. 23—202)

This invention relates to the production of titanium oxide pigments and has special reference to novel purification of seed for use in the hydrolyses of hydrolyzable titanium salt solution, the hydrolysate of which yields rutile titanium dioxide pigment on calcination.

In the hydrolyses of titanium salt solutions, particularly titanium sulfate solutions, it is generally desirable that the seed nuclei prepared from dispersions containing monovalent anions be freed of such monovalent anions prior to their use as seed. For such removal of extraneous anions, laborious coagulation, filtration and washing has been resorted to heretofore.

Among the objects of this invention is the provision of a method of removing such monovalent anions from the titanium hydrate nuclei that is more efficient, cheaper and less laborious than the methods heretofore employed and does not impair the efficiency of the nuclei as seed.

A further object of this invention is the provision of a process of removing monovalent anions from titanium hydrate nuclei prepared by a variety of methods and materials.

Other, further and more specific objects of this invention will become readily apparent to persons skilled in the art from a consideration of the following description.

I have found by dializing dispersions of nuclear titanium hydrate, prepared by a wide variety of ways and from a wide variety of materials, that effective and efficient removal of undesirable, extraneous anions is accomplished in a cheaper and easier manner than by the processes formerly practiced. I have also found that the values of the nuclear titanium hydrate as seed in hydrolysis are not impaired.

My invention is applicable to various types of cured seed, such as those prepared from peptized sols, solutions, dilute seeds, etc., whether or not stabilizers are present during curing, as will be seen from the following examples.

Example I

Portions of titanium chloride solution, 237 g./l. $TiO_2$ and 381 g./l. HCl and made from titanium tetrachloride were treated as follows:

(a) 42.2 c.c. of the titanium chloride solution and 11.4 c.c. of a solution containing 17.5 g./l. $H_2SO_4$ were added to water, so that the final volume was one liter. The concentration was then 10 g./l. $TiO_2$, with $H_2SO_4$ equal to 2% of $TiO_2$ content and serving as a stabilizer. The solution was heated 10 minutes at 90° C. to develop the nuclear properties, after which the resulting dispersion was clear and opalescent.

(b) 84.4 c.c. of the titanium chloride solution and 22.8 c.c. of a solution containing 17.5 g./l. $H_2SO_4$ were added to water so that the final volume was one liter. The concentration was then 20 g./l. $TiO_2$, with $H_2SO_4$ equal to 2% of the $TiO_2$ content. The solution was heated 10 minutes at 90° C. to develop the nuclear properties, after which the resulting dispersion was clear and opalescent.

Example II

Pure titanium sulfate liquor was used. It was made from titanyl sulfate having

| | |
|---|---|
| $TiO_2$ | g./l. 209 |
| $H_2SO_4$ | g./l. 397 |
| Acid factor | 1.55 |

The acid factor is the mol ratio of free plus combined acid to $TiO_2$.

To 814 c.c. of the above solution, under rapid agitation, was added a water slurry of 190 g. calcium carbonate. The precipitated calcium sulfate was removed by filtration. A saturated solution of barium chloride was then added, in amount just sufficient to precipitate from solution the remaining sulfate ions. The precipitated barium sulfate was removed by filtration, and two different parts of the filtrate were treated as follows:

(a) The first part containing 60 gr. $TiO_2$ was treated with citric acid equivalent to an amount of $H_2SO_4$ equal to 2% of the $TiO_2$ content, diluted to 1 liter and heated 10 minutes at 90° C. to develop the nuclear properties, after which the resulting dispersion appeared stable and opalescent.

(b) The second part containing 90 gr. $TiO_2$ was treated with citric acid equivalent to an amount of $H_2SO_4$ equal to 4% of the $TiO_2$ content, diluted to one liter and heated 10 minutes at 90° C. to develop the nuclear properties, after which the resulting dispersion appeared stable and opalescent.

The nuclear dispersions prepared by the foregoing Examples I and II were successfully dialyzed. Dialysis was performed by placing each nuclear dispersion in a bag-shaped membrane permeable to HCl, but impermeable to the dispersed titanium hydrate nuclei, and circulating fresh water on the outside of the membrane. Chloride ions were thus removed by osmotic action, leaving inside the membrane a nuclear material of unimpaired efficiency having a gel structure.

When the acid content of the nuclear dispersion had been reduced to a value of 2–3 g./l. HCl, the resulting gels were used for hydrolyzing with the following titanium sulfate liquor:

| | G./l. |
|---|---|
| Total $TiO_2$ | 284 |
| Reduced $TiO_2$ | 6.1 |
| Fe | 61.0 |
| Total $H_2SO_4$ | 710 |
| Active $H_2SO_4$ | 603 |
| Acid factor | 1.73 |

Hydrolyses were made at final concentrations in the range of 160-200 g./l. $TiO_2$ with each of the above dialyzed nuclear agents so that amounts from 0.5% to 5% $TiO_2$ were added as seed on the basis of the $TiO_2$ in the hydrolysis liquor. The hydrolyses were continued at boiling until a yield of 90-95% $TiO_2$ was obtained.

The resulting acid cakes were washed free of impurities and calcined in the range of 925-975° C., producing bright rutile titanium oxide pigments of good color and high tinting strength.

*Example III*

A pure titanium chloride solution was prepared from $TiCl_4$, and containing 160 g./l. $TiO_2$ and 180 g./l. HCl. The solution was divided into several portions which were treated with $H_2SO_4$ in amounts of 0.0, 0.5, 0.75, 1.0, 1.5, 2.0, 2.5, 3.0, 4.0, 5.0 and 6.0% by weight of the $TiO_2$ content. The solutions were diluted to concentrations containing 20-60 g./l. $TiO_2$ and were cured; i. e. heated to 90° C. and kept at this temperature for 10 minutes. The solutions were then cooled quickly to below 50° C.

All of these solutions were dialized in a bag-shaped membrane permeable to HCl, but impermeable to the dispersed titanium hydrate nuclei, by circulating fresh water on the outside of the membrane. Chlorine ions were thus removed by osmotic action, leaving inside the membrane a nuclear material of unimpaired efficiency, and having a gel structure.

Seed containing no $H_2SO_4$ was opaque, and a white precipitate formed after 1 hour. The other seeds were opalescent and stable. After 2 weeks the seeds treated with 2.5 to 6.0% $H_2SO_4$ were still colloidal. The seeds with less than 2.5% $H_2SO_4$ had precipitated within 2 weeks, but those with higher content of stabilizer had greater stability than those with lower stabilizer content.

The amount of stabilizer should generally not exceed 6.5% by weight of the $TiO_2$ content, or 55 millimols of stabilizer per mol of $TiO_2$, in order to form a stable dispersion and the minimum amount of stabilizer is slightly under 0.5%, or 4 millimols of stabilizer per mol of $TiO_2$. For most practical purposes the quantity of stabilizer is preferred in the range of 2.5-3.6% $H_2SO_4$ or 20-30 millimols of $H_2SO_4$ per mol of $TiO_2$. When the HCl concentration in the dispersion to be stabilized is low; e. g. 20 g./l., it is preferable to use 0.5-3.6% $H_2SO_4$ or 4-30 millimols $H_2SO_4$ per mol of $TiO_2$. On the contrary, where the HCl concentration in the dispersion to be stabilized is high, for example 40 g./l., it is preferable to employ 2.5-6.0% $H_2SO_4$ or 20-50 millimols of $H_2SO_4$ per mol of $TiO_2$.

These nuclear gels, when added to a washed anatase acid cake, prior to calcination, were also effective in converting anatase acid cakes into rutile $TiO_2$ during calcination.

The term "stabilize" and its derivatives are used herein to denote impartation to the dispersed titanium hydrate seed nuclei of the property of maintaining practically its entire activity, potency and efficiency as a seed for prolonged periods of time after stabilization.

The present invention is not limited to the specific detail set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a continuation-in-part of my applications Serial Nos. 516,212 and 516,213, filed December 30, 1943.

I claim as my invention:

1. A method comprising dialyzing a colloidal dispersion of titanium hydrate nuclei formed by curing by heating a titanium tetrachloride solution to develop nuclei, an inorganic stabilizer having polyvalent anions in amount of 4-55 millimols per mol of $TiO_2$ being present in the solution during curing, and thereby removing extraneous anions.

2. A method comprising dialyzing a colloidal dispersion of titanium hydrate nuclei formed by curing by heating a titanium tetrachloride solution to develop nuclei, an organic stabilizer having polyvalent anions in amount of 4-55 millimols per mol of $TiO_2$ being present in the solution during curing, and thereby removing extraneous anions.

3. A method comprising dialyzing a colloidal dispersion of titanium hydrate nuclei formed by curing by heating a titanium tetrachloride solution to develop nuclei, a stabilizer comprising sulfuric acid in amount of 4-55 millimols per mol of $TiO_2$ being present in the solution during curing, and thereby removing extraneous anions.

4. A method comprising dialyzing a colloidal dispersion of titanium hydrate nuclei formed by curing by heating a tiatnium tetrachloride solution to develop nuclei, a stabilizer comprising citric acid in amount of 4-55 millimols per mol of $TiO_2$ being present in the solution during curing, and thereby removing extraneous anions.

5. A method comprising dialyzing a colloidal dispersion of titanium hydrate nuclei formed by curing by heating a titanium tetrachloride solution to develop nuclei, a stabilizer having polyvalent anions in amount of 4-55 millimols per mol of $TiO_2$ being present in the solution during curing, and thereby removing extraneous anions.

6. A method comprising dialyzing a colloidal dispersion of titanium hydrate nuclei formed by curing by heating a titanium tetrachloride solution to develop nuclei, a stabilizer having polyvalent anions in amount of 20-30 millimols per mol of $TiO_2$ being present in the solution during curing, and thereby removing extraneous anions.

7. A method comprising dialyzing a colloidal dispersion of titanium hydrate nuclei formed by curing by heating a titanium tetrachloride solution to develop nuclei, a stabilizer having polyvalent anions in amount of 4-30 millimols per mol of $TiO_2$ being present in the solution during curing, and thereby removing extraneous anions.

8. A method comprising dialyzing a colloidal dispersion of titanium hydrate nuclei formed by curing by heating a titanium tetrachloride solution to develop nuclei, a stabilizer having polyvalent anions in amount of 20-55 millimols per mol of $TiO_2$ being present in the solution during curing, and thereby removing extraneous anions.

MAX J. MAYER.